(No Model.)
W. H. MORGAN.
BICYCLE BRAKE.
No. 577,404.                    Patented Feb. 16, 1897.
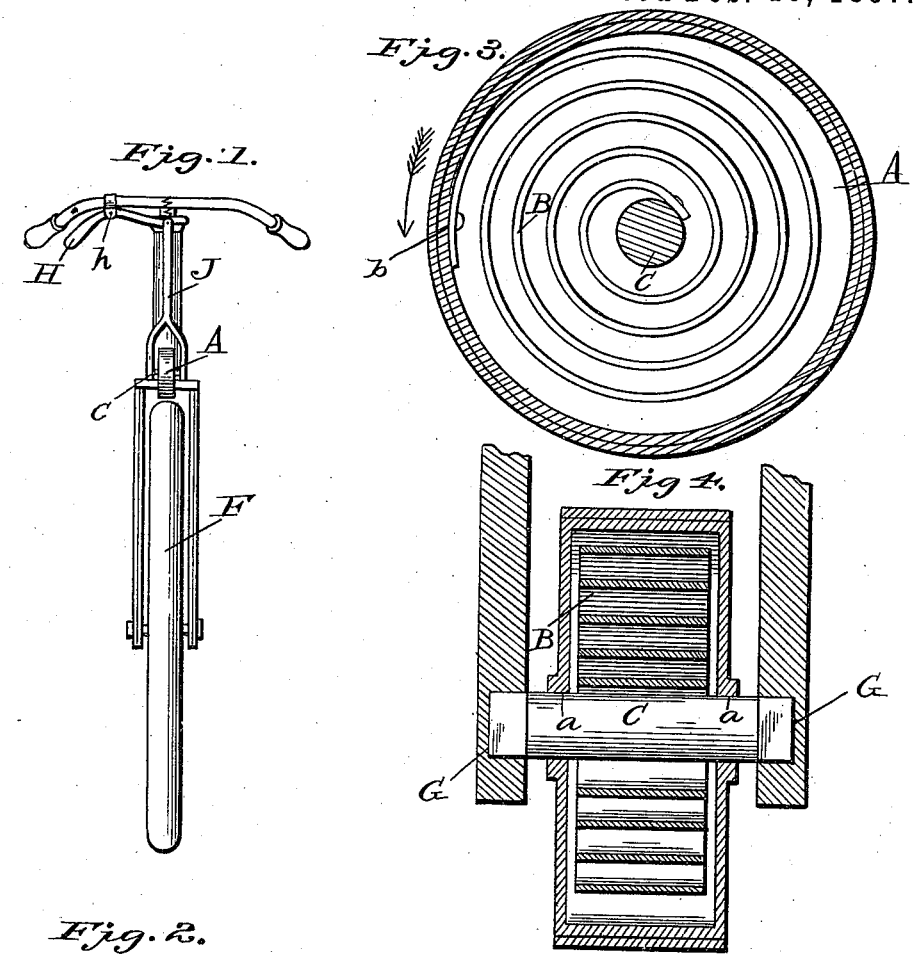
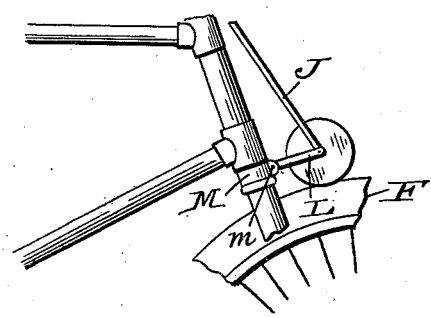
Witnesses
Edwin G. McKee
K. A. Nau
Inventor
William H. Morgan
By John Wedderburn
his Attorney.

UNITED STATES PATENT OFFICE.

WILLIAM HENRY MORGAN, OF PEABODY, KANSAS.

BICYCLE-BRAKE.

SPECIFICATION forming part of Letters Patent No. 577,404, dated February 16, 1897.

Application filed February 8, 1896. Serial No. 578,599. (No model.)

*To all whom it may concern:*

Be it known that I, WILLIAM HENRY MORGAN, a citizen of the United States, residing at Peabody, in the county of Marion and State of Kansas, have invented certain new and useful Improvements in Bicycle-Brakes or Wheel-Brakes; and I do hereby declare the following to be a full, clear, and exact description of the invention, such as will enable others skilled in the art to which it appertains to make and use the same.

This invention relates to certain new and useful improvements in wheel-brakes; and it has for its objects, among others, to provide a simple and cheap yet durable and efficient brake and means for retarding the too-rapid motion of a wheel without undue friction or unnecessary rubbing together of any parts.

It has for a further object to protect the outer rim or tire of wheels against which it is desired to use the brake.

I provide a brake consisting of a wheel or wheels which, when used to retard another wheel, shall be pressed against the periphery thereof; but the brake-wheel shall itself be retarded by a coiled spring of the required length and strength for the purpose intended and all friction thus avoided.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a front elevation of a bicycle provided with my improved brake. Fig. 2 is a side elevation showing another way of applying the brake. Fig. 3 is an enlarged view of the brake. Fig. 4 is an enlarged sectional view of the same.

Like letters of reference indicate like parts throughout the several views.

Referring now to the details of the drawings by letter, A designates the brake-wheel, which may be of any required diameter, and in its preferable form is formed of light thin yet strong material, with tightly-closed sides to exclude the dirt and dust, &c., and the sides or heads just far enough apart to admit the spring B and allow the same to turn freely, the opposite sides or ends being provided with holes *a*, which are by preference reinforced, as shown, and through these holes extends the shaft or axle C, and the walls of these holes are the only parts of the wheel that touch the shaft or axle. These holes may be easily oiled, so as to keep the axle well lubricated. The inside will require no attention except in case of breakage.

The spring B is attached at one end to the inner face of the rim of the wheel, as seen at *b*, and the other end is secured in any suitable manner to the said shaft or axle.

In practice the brake-wheel is set in such position against the periphery of the wheel it is intended to retard that the forward motion of the latter, acting against the rim or tire (when one is employed) of the brake-wheel, will cause the spring to be wound up closer and closer around the fixed and non-revolving axle or shaft, and every subsequent revolution of the brake-wheel will be retarded more powerfully than the preceding revolution until finally the spring is wound up entirely or nearly so and the brake-wheel can go no farther. Then if the momentum is not sufficiently decreased the brake-wheel may be instantly released from pressure, allowed to unwind automatically, and again be applied; but if the spring be constructed of the proper length and strength it should in nearly all cases bring the larger wheel to a stop before the spring is entirely wound up once, and this without friction except that incident to the turning of wheels upon their axles. The arrow in Fig. 3 indicates the direction of rotation of the brake-wheel when in use.

The brake-wheel may be mounted and designed to be pressed into use or action in a variety of ways. In Fig. 1 I have shown one way, and in this view it is shown as applied to a bicycle, and while it may be applied in different positions and adapted to be actuated either by hand or foot it is here shown as placed above the front wheel F of the bicycle and between the frame, so that the shaft or axle of the brake-wheel after projecting at each side through its own frame, to which it is rigidly attached, may further project into a groove G on the inner face of each fork of the main frame, as shown. This groove, while permitting the brake-axle to move freely up and down, will at the same time strengthen the brake-wheel against twisting and serve to hold it parallel with the wheel of the bicycle. In this instance the brake-wheel is shown as adapted to be actuated by the brake-lever H, pivotally mounted, as at $h$, on the handle-bar and connected by the rod or link J with the brake-wheel.

In Fig. 3 I have shown the brake-wheel axle as supported from the arms or links L, which are hinged, as at $m$, to the clamp or ring M on the front post of the bicycle, the said brake-wheel or its axle being connected with the link or bar J, which in turn is adapted to be connected with the brake-lever.

Modifications in detail may be resorted to without departing from the spirit of the invention or sacrificing any of its advantages.

The rim of the brake-wheel may be provided with any suitable tire, such as a rubber one, for use in connection with the pneumatic tires of bicycles or a toothed or cog periphery for coöperation with a cog-wheel that it is employed to retard.

What is claimed as new is—

1. The combination with the brake-wheel, of an axle upon which it is loosely mounted, and a coiled spring arranged within the wheel and attached at one end to the rim and at the other end to said axle, substantially as specified.

2. The combination with a bicycle-frame having grooves on the inner faces thereof, of a brake-wheel having its axle projecting into said grooves, the coiled spring arranged within the wheel and attached at one end to the rim and at the other end to the axle of said wheel upon which the latter is loosely mounted, substantially as and for the purpose specified.

3. The combination with the frame of a bicycle, of a support hinged therefrom, the brake-wheel axle carried by said hinged support, the brake-wheel loosely mounted on said axle and provided with an interior retarding-spring with one end attached to the rim and the other to the axle and a connection between said wheel and an operating-lever, substantially as specified.

In testimony whereof I have signed this specification in the presence of two subscribing witnesses.

WILLIAM HENRY MORGAN.

Witnesses:
H. B. WATSON,
GEO. S. FUNK.